(12) United States Patent
Cheon et al.

(10) Patent No.: US 8,520,597 B2
(45) Date of Patent: Aug. 27, 2013

(54) APPARATUS AND METHOD FOR PROCESSING DATA IN AD-HOC NETWORK

(75) Inventors: Byoung Yoon Cheon, Seoul (KR); Yong I Kim, Yongin (KR)

(73) Assignee: Lig Nex1 Co., Ltd., Seoul (KR)

( * ) Notice: Subject to any disclaimer, the term of this patent is extended or adjusted under 35 U.S.C. 154(b) by 329 days.

(21) Appl. No.: 12/976,715

(22) Filed: Dec. 22, 2010

(65) Prior Publication Data

US 2012/0020285 A1  Jan. 26, 2012

(30) Foreign Application Priority Data

Jul. 20, 2010 (KR) .................. 10-2010-0069849

(51) Int. Cl.
*H04W 4/00* (2009.01)
*H04B 7/212* (2006.01)

(52) U.S. Cl.
USPC .......................................... 370/328; 370/444

(58) Field of Classification Search
USPC ................................. 370/328, 406
See application file for complete search history.

(56) References Cited

U.S. PATENT DOCUMENTS

| | | | | |
|---|---|---|---|---|
| 7,639,709 B1 * | 12/2009 | Amis et al. | ..................... | 370/462 |
| 2009/0129321 A1 * | 5/2009 | Jain | ............................... | 370/328 |
| 2010/0067451 A1 * | 3/2010 | Hall | ............................. | 370/329 |
| 2011/0044172 A1 * | 2/2011 | Yim et al. | ..................... | 370/236 |
| 2011/0103232 A1 * | 5/2011 | Sood | ............................. | 370/241 |

OTHER PUBLICATIONS

Ozan K. Tonguz et al., "On the Broadcast Storm Problem in Ad hoc Wireless Networks", 2006, IEEE.
Sang-Ik Cha et al., "3-Hop-Ahead Path Reservation Scheme for Expedite Traffic in Wireless Sensor Networks", 2009, IEEE.

* cited by examiner

*Primary Examiner* — Ayaz Sheikh
*Assistant Examiner* — Mariela Vidal Carpio

(57) ABSTRACT

Provided are an apparatus and a method for processing data in an ad-hoc network, particularly, an MANET. The method includes: (a) determining whether to generate any one of first data and second data having a priority lower than the first data; (b) when predetermined data is generated in accordance with the determination, measuring a mode value related to the driving of a first node which currently possesses the predetermined generated data; and (c) processing, by the first node, the generated data by considering a content of the generated data and the measured mode value.

12 Claims, 9 Drawing Sheets

FIG. 9

| NODE | SILENT MODE SETUP NODE MARKED AFTER VOICE DATA HAVING BEEN TRANSMITTED THROUGH VOICE PATH 2 | SILENT MODE SETUP NODE MARKED AFTER VOICE DATA HAVING BEEN TRANSMITTED THROUGH VOICE PATH 3 |
|---|---|---|
| 1 |  | 2 |
| 2 | 10 | 2 |
| 3 | 10 | 2 |
| 4 | 10 | 2 |
| 6 |  | 2 |
| 7 |  | 2 |
| 10 | 10 | 10 |
| 11 | 10 | 2 |
| 12 | 10 | 2 |
| 13 | 10 | 10 |

APPARATUS AND METHOD FOR PROCESSING DATA IN AD-HOC NETWORK

BACKGROUND OF THE INVENTION

1. Field of the Invention

The present invention relates to an apparatus and a method for processing data in an ad-hoc network. More particularly, the present invention relates to an apparatus and a method for processing data in a mobile ad-hoc network (MANET).

2. Description of the Related Art

Interferences caused by other data or other factors must not occur on a traffic path through which voice data is transmitted in order to normally transmit urgent voice data of a node having a high priority.

In the related art, for this, a transmitting node that transmits the voice data receives a response signal indicating that a receiving node receives the voice data from the receiving node receiving the voice data in order to judge whether a data transmission loss occurs due to the interferences. If the data transmission loss occurs due to the interferences, the transmitting node solves an error in data transmission through retransmission.

However, a data transmission delay is inevitable due to the retransmission only by such a method. Further, the data transmission loss may occur again on the traffic path and the voice data may not be abnormally transmitted due to a limit in the number of retransmission times.

SUMMARY OF THE INVENTION

The present invention has been made in an effort to provide an apparatus and a method for processing data in an ad-hoc network, which process the data by discriminating between urgent voice data and general data in the silent mode of a node.

An exemplary embodiment of the present invention provides a method for processing data in an ad-hoc network, including: (a) determining whether to generate any one of first data and second data having a priority lower than the first data; (b) when predetermined data is generated in accordance with the determination, measuring a mode value related to the driving of a first node which currently possesses the predetermined generated data; and (c) processing, by the first node, the generated data by considering a content of the generated data and the measured mode value.

Preferably, the method may further include generating the first data as an intermediate step between step (a) and step (b), wherein when the first node generates the first data, the step (c) includes: (ca) when the measured mode value of the first node is a second mode which does not coincide with a predetermined first data processing criterion, forcing the first node into the first mode which coincides with the first data processing criterion; (cb) judging whether the first node is a destination node which will finally receive the first data; and (cc) when the first node is the destination node, providing, by the first node, the first data to a user and when the first node is not the destination node, transmitting, by the first node, the first data to a second node. More preferably, the step (ca) may include: (caa) designating a node of the higher priority between the destination node of the first data and the first node as a mode setup node which sets up mode conversion of the first node; and (cab) forcing the first node into the first mode on the occurrence of the mode setup node and setting a timer value to maintain the first mode.

When the measured mode value of the first node is the first mode, the step (ca) may further include: (caa) judging whether at least one node of the destination node of the first data and the first node, a candidate mode setup node, has a priority higher than or equal to the current mode setup node which formerly forced the first node into the first mode; (cab) when a candidate mode setup node has a priority higher than or equal to the current mode setup node at the step (caa), designating the node having the higher priority between the destination node and the first node as the new mode setup node replacing the current mode setup node; and (cac) changing the first mode maintaining time of the first node on the occurrence of the new mode setup node, wherein at the step (c), when the candidate mode setup node has a priority lower than the current mode setup node at the step (caa), the first node discards the first data. At the step (caa), a data transmission priority depending on a predetermined routing protocol may be used on the basis of a priority judgment criterion The method may further include generating the second data as an intermediate step between the step (a) and the step (b), wherein when the first node generates the second data, the step (c) includes: (ca) when the measured mode value of the first node is the first mode which coincides with the predetermined first data processing criterion, discarding, by the first node, the second data and when the mode value of the first node is the second mode, judging whether the first node is a destination node which will finally receive the second data; and (cb) when the first node is the destination node, providing, by the first node, the second data to a user and when the first node is not the destination node, transmitting, by the first node, the second data to the second node.

The method may further include receiving the first data as an intermediate step between the step (a) and the step (b), wherein when the first node receives the first data, at the step (c), the first data is processed depending on whether the measured mode value of the first node is the first mode which coincides with the predetermined first data processing criterion or the second mode which does not coincide with the first data processing criterion.

When the first node is in the first mode, the step (c) may include: (ca) judging whether at least one of the destination node of the first data and the source node of the first data, a candidate mode setup node, has a priority higher than or equal to the current mode setup node which formerly forced the first node into the first mode; (cb) when the candidate mode setup node has a priority higher than or equal to the current mode setup node at the step (ca), designating the node having the higher priority between the destination node and the source node as the new mode setup node replacing the current mode setup node and changing the first mode maintaining timer value of the first node on the occurrence of the new mode setup node and when the candidate mode setup node has a priority lower than the current mode setup node at the step (ca), discarding, by the first node, the first data; (cc) judging whether the first node is the destination node of the first data; (cd) when the first node is the destination node, providing, by the first node, the first data to the user and when the first node is not the destination node, judging whether the first node is a relay node which relays the first data; and (ce) when the first node is the relay node, transmitting, by the first node, the first data to the second node and when the first node is not the relay node, discarding the first data.

When the first node is in the second mode, the step (c) may include: (ca) designating a node of the higher priority between the destination node of the first data and the source node of the first data as the mode setup node which sets up mode conversion of the first node; (cb) forcing the first node into the first mode on the occurrence of the mode setup node and setting a timer value to maintain the first mode; (cc)

judging whether the first node is the destination node of the first data; (cd) when the first node is the destination node, providing, by the first node, the first data to the user and when the first node is not the destination node, judging whether the first node is the relay node which relays the first data; and (ce) when the first node is the relay node, transmitting the first data to the second node and when the first node is not the relay node, discarding the first data.

The method may further include: receiving the second data as an intermediate step between the step (a) and the step (b), wherein when the first node receives the second data, the step (c) includes: (ca) judging whether the measured mode value of the first node is the first mode which coincides with the predetermined first data processing criterion; (cb) when it is judged that the mode value of the first node is the first mode, discarding the second data and when it is judged that the mode value of the first node is not the first mode, judging whether the first node is a destination node of the second data; (cc) when it is judged that the first node is the destination node, providing, by the first node, the second data to the user and when it is judged that the first node is not the destination node, judging whether the first node is a relay node which relays the second data; and (cd) when it is judged that the first node is the relay node, transmitting, by the first node, the second data to the second node and when it is judged that the first node is not the relay node, discarding, by the first node, the second data.

In this particular ad-hoc network, the first data is set as voice data and the second data is set as data other than the voice data.

At least one node provided in the ad-hoc network including the first node is a movable node.

Another exemplary embodiment of the present invention provides an apparatus for processing data in an ad-hoc network, including: a determination unit determining whether to generate any one of first data and second data having a priority lower than the first data; a measurement unit measuring a mode value related to the driving of a first node which currently possesses the predetermined generated data when predetermined data is generated in accordance with the determination; and a processing unit processing the generated data by considering a content of the generated data and the measured mode value.

The apparatus may further include a first data generator generating the first data, wherein when the first node generates the first data, the processing unit includes: when the measured mode value of the first node is a second mode which does not coincide with a predetermined first data processing criterion, a mode converter forcing the first node into the first mode which coincides with the first data processing criterion; a destination node judger judging whether the first node is a destination node which will finally receive the first data; and a data processor providing the first data to a user when the first node is the destination node and transmitting the first data to a second node when the first node is not the destination node. More preferably, the mode converter may include: a set-up node designating portion designating a node of the higher priority between the destination node of the first data and the first node as a mode setup node which sets up mode conversion of the first node; a conversion portion forcing the first node into the first mode on the occurrence of the mode setup node; and a time setting portion setting a timer value to maintain the first mode.

When the measured mode value of the first node is the first mode, the mode converter may include: a priority judging portion judging whether at least one of the destination node of the first data and the first node, a candidate mode setup node, has a priority higher than or equal to the current mode setup node which formerly forced the first node into the first mode; a set-up node designating portion designating the node having the higher priority between the destination node and the first node as the new mode setup node when the candidate mode setup node has a priority higher than or equal to the current mode setup node in accordance with the judgment; and a time changing portion changing the first mode maintaining timer value of the first node on the occurrence of the new mode setup node, wherein the processing unit discards the first data when the candidate mode setup node has a priority lower than the current mode setup node in accordance with the judgment. The priority judging portion may use a data transmission priority depending on a predetermined routing protocol as a priority judgment criterion.

The apparatus may further include a second data generating unit generating the second data, wherein when the first node generates the second data, the processing unit includes: a destination node judger judging whether the first node is a destination node of the second data when the measured value of the first node is not the first mode which coincides with the predetermined first processing criterion; and a data processor discarding the second data when the mode value of the first node is the first mode, providing the second data to the user when it is judged that the first node is the destination node, and transmitting the second data to the second node when it is judged that the first node is not the destination node.

The apparatus may further include a first data receiving unit receiving the first data, wherein when the first node receives the first data, the processing unit processes the first data depending on whether the measured mode value of the first node is the first mode which coincides with the predetermined first processing criterion or the second mode which does not coincide with the first data processing criterion.

When the mode value of the first node is the first mode, the processing unit may include: a priority judging unit judging whether at least one of the destination node of the first data and the source node of the first data, a candidate mode setup node, has a priority higher than or equal to the current mode setup node which formerly forced the first node into the first mode; a set-up node designating unit designating the node of the higher priority between the destination node and the source node as the new mode setup node when the candidate mode setup node has a priority higher than or equal to the current mode setup node; a time changing unit changing the first mode maintaining timer value of the first node on the occurrence of the designated node; a destination node judging unit judging whether the first node is the destination node of the first data; a relay node judging unit judging whether the first node is a relay node which relays the first data when the first node is not the destination node; and a data processor discarding the first data when it is judged that the candidate mode setup node has a priority lower than the current mode setup node or that the first node is not the relay node, providing the first data to the user when it is judged that the first node is the destination node and transmitting the first data to the second node when it is judged that the first node is the relay node.

When the mode value of the first node is the second mode, the processing unit may include: a set-up node designating unit designating any one having the higher priority between the destination node of the first data and the source node of the first data as a mode setup node which sets up mode conversion of the first node; a mode converter forcing the first node into the first mode on the occurrence of the mode setup node; a time setting unit setting a timer value to maintain the first mode; a destination node judging unit judging whether the first node is the destination node of the first data; a relay node judging unit judging whether the first node is the relay node which relays the first data when the first node is not the destination node; and a data processor providing the first data to the user when the first node is the destination node, transmitting the first data to the second node when the first node is the relay node, and discarding the first data when the first node is not the relay node.

The apparatus may further includes a second data receiving unit receiving the second data, wherein when the first node receives the second data, the processing unit may include a mode judging unit judging whether the measured mode value of the first node is the first mode which coincides with the predetermined first data processing criterion; a destination node judging unit judging whether the first node is a destination node of the second data when it is judged that the mode value of the first node is not the first mode; a relay node judging unit judging whether the first node is a relay node which relays the second data when it is judged that the first node is not the destination node; and a data processor discarding the second data when it is judged that the first node is in the first mode or that the first node is not the relay node, providing the second data to the user when it is judged that the first node is the destination node, and transmitting the second data to the second node when it is judged that the first node is the relay node.

According to the exemplary embodiments of the present invention, it is possible to obtain the following advantages by processing data by separating urgent voice data and general data by using the silent mode of a node. First, it is possible to remove interference in a traffic path at the time of transmitting urgent voice data of a node having a high priority through a network. Second, it is possible to remove a transmission delay or a transmission loss of the voice data.

BRIEF DESCRIPTION OF THE DRAWINGS

FIG. 9 is a diagram listing up nodes which went into the silent mode after having transmitted the voice data.

DETAILED DESCRIPTION OF THE EMBODIMENTS

Figure 1:
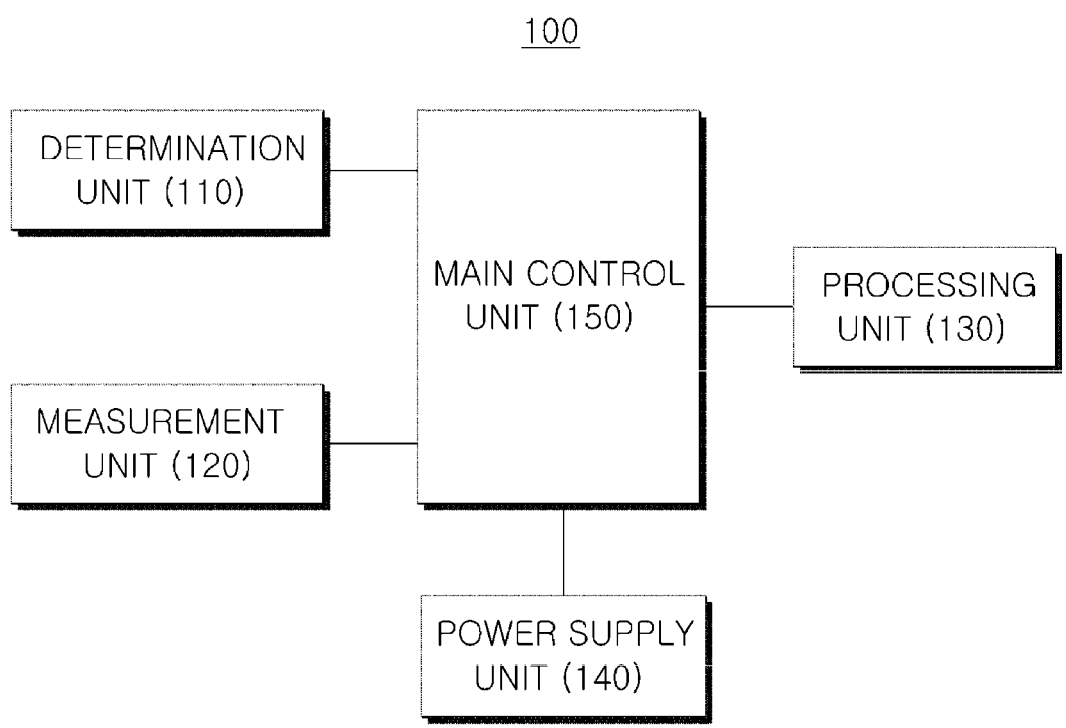
FIG. 1 is a schematic block diagram of an apparatus for processing data in an ad-hoc network according to an exemplary embodiment of the present invention.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a schematic block diagram of an apparatus for processing data in an ad-hoc network according to an exemplary embodiment of the present invention. Referring to FIG. 1, the data processing apparatus 100 in the ad-hoc network includes a determination unit 110, a measurement unit 120, a processing unit 130, a power supply unit 140, and a main control unit 150.

The exemplary embodiment relates to a method of using a silent mode based on a priority in order to prevent an urgent data traffic path from being influenced by interference at the time of transmitting emergency data in the ad-hoc network. The exemplary embodiment may be applied when urgent voice data is transmitted in a mobile ad-hoc network (MANET) and may minimize loss-related problems such as the interference in the traffic path, a transmission delay, and the like at the time of transmitting the urgent voice data from or to a node having a high priority.

The determination unit 110 determines whether to generate any one of the first data and second data having a priority lower than the first data. The first data has a priority higher than the second data in accordance with a predetermined criterion. In the exemplary embodiment, the first data includes voice data, particularly, urgent voice data and the second data as data other than the urgent voice data includes video data, text, symbol, and sign data, and the like. However, in the exemplary embodiment, they are not necessarily limited thereto.

When predetermined data (first data or second data) is generated in accordance with the determination by the determination unit 110, the measurement unit 120 measures a mode value related to the driving of a first node that currently possesses the predetermined generated data. In the exemplary embodiment, the data processing apparatus 100 may further include a first data generating unit (not shown) generating the first data and a second data generating unit (not shown) generating the second data.

The processing unit 130 processes the generated data by considering a content of the generated data and the mode value measured by the measurement unit 120.

The power supply unit 140 supplies power to each of the components constituting the data processing apparatus 100.

The main control unit 150 controls an overall operation of each component constituting the data processing apparatus 100.

The data processing apparatus 100 may be provided in each of nodes constituting the ad-hoc network, i.e., the first node. In this case, each node constituting the ad-hoc network may have mobility. If the first node generates the first data through the first data generating unit, the processing unit 130 may include a mode converter (not shown), a destination node judger (not shown), a data processor (not shown), and the like.

If the measured mode value of the first node is the second mode which does not coincide with a predetermined first data processing criterion, the mode converter forces the first node into the first mode which coincides with the first data processing criterion. In the exemplary embodiment, the first mode represents a silent mode. Specifically, the first mode represents the silent mode having a condition for transmitting the urgent voice data in accordance with the first data processing criterion. The second mode as a mode other than the silent mode may represent a general mode.

If the measured mode value of the first node is the second mode, the mode converter may include a set-up node designating portion (not shown), a conversion portion (not shown), a time setting portion (not shown), and the like. The set-up node designating portion designates any one having the higher priority between the destination node of the first data and the first node as a mode setup node that sets up mode conversion of the first node. If the destination node and the first node have the equivalent priority, the set-up node designating portion designates any node of the destination node and the first node as the mode setup node. The mode converter forces the first node into the first mode on the occurrence of the mode setup node. The time setting portion sets a timer value to maintain the first mode.

If the measured mode value of the first node is the first mode, the mode converter may include a priority judging portion (not shown), a set-up node designating portion (not shown), a time changing portion (not shown), and the like. The priority judger judges whether at least one node of the destination node of the first data and the first node, a candidate mode setup node, has a priority higher than or the same as the current mode setup node that formerly forced the first node into the first mode. In the exemplary embodiment, the priority judger uses a data transmission priority depending on a predetermined routing protocol as the priority judgment criterion. If the candidate mode setup node has the priority higher than or the same as the current mode setup node in accordance with the judgment of the priority judger, the set-up node designating portion designates the node having the higher priority of the destination node and the first node as the new mode setup node. If the destination node and the first node have the equivalent priority, the set-up node designating portion designates any node of the destination node and the first node as the mode setup node. The time changing portion changes a first mode maintaining timer value of the first node on the occurrence of the new mode setup node. Meanwhile, the processing unit 130 discards the first data if the candidate mode setup node has the priority lower than the current mode setup node depending on the determination of the priority judger.

The destination node judger judges whether the first node is the destination node that will finally receive the first data.

When it is judged that the first node is the destination node, the data processor provides the first data to a user of the first node and when it is judged that the first node is not the destination node, the data processor transmits the first data to the second node.

If the first node generates the second data through the second data generating unit, the processing unit 130 may include a destination node judger (not shown), a data processor (not shown), and the like.

If the measured mode value of the first node is not the first mode which coincides with the predetermined first data processing criterion, the destination node judger judges whether the first node is a destination node that will finally receive the second data.

The data processor discards the second data when the mode value of the first node is the first mode, provides the second data to the user of the first node when the mode value of the first node is the second mode and it is judged that the first node is the destination node, and transmits the second data to the second node when the mode value of the first node is the second mode and it is judged that the first node is not the destination node.

Meanwhile, the first node may be a node that does not generate the first data, i.e., the urgent voice data but receive the first data. In the exemplary embodiment, by considering such a point, the data processing apparatus 100 may include a first data receiving unit (not shown) or a second data receiving unit (not shown) instead of the first data generating unit or the second data generating unit. The first data receiving unit receives the first data and the second data receiving unit receives the second data.

If the first node receives the first data through the first data receiving unit, the processing unit 130 processes the first data depending on whether the measured mode value of the first node is the first mode which coincides with the predetermined first data processing criterion or the second mode which does not coincide with the first data processing criterion.

In this case, when the mode value of the first node is the first mode, the processing unit 130 may include a priority judging portion (not shown), a set-up node designating portion (not shown), a time changing portion (not shown), a destination node judger (not shown), a relay node judger (not shown), a data processor (not shown), and the like.

The priority judger judges whether at least one node of the destination node of the first data and a source node of the first data, a candidate mode setup node, has a priority higher than or the same as the current mode setup node that formerly forced the first node into the first mode.

When it is judged that the candidate mode setup node has a priority higher than or the same as the current mode setup node, the set-up node designating portion designates a node having the higher priority of the destination node and the source node as the new mode setup node. When the destination node and the source node have an equivalent priority, the set-up node designating portion designates any one of the destination node and the source node as the mode setup node.

The time changing portion changes the first mode maintaining timer value of the first node on the occurrence of the new mode setup node.

The destination node judger judges whether the first node is the destination node that will finally receive the first data.

When it is judged that the first node is not the destination node, the relay node judger judges whether the first node is a relay node that relays the first data.

The data processor discards the first data when it is judged that the candidate mode setup node has a priority lower than the current mode setup node or that the first node is not the relay node and the destination node, provides the first data to the user when it is judged that the first node is the destination node, and transmits the first data to the second node when it is judged that the first node is the relay node.

Meanwhile, when the mode value of the first node is the second mode, the processing unit 130 may include a set-up node designating portion, a mode converter, a time setting portion, a destination node judging portion, a relay node judger, a data processor, and the like.

The set-up node designating portion designates any one having the higher priority between the destination node of the first data and the source node of the first data as the mode setup node that sets up mode conversion of the first node.

The mode converter forces the first node into the first mode on the occurrence of the mode setup node.

The time setting portion sets a timer value to maintain the first mode.

The destination node judger judges whether the first node is the destination node that will finally receive the first data.

When it is judged that the first node is not the destination node, the relay node judger judges whether the first node is a relay node that relays the first data.

The data processor provides the first data to the user when it is judged that the first node is the destination node, transmits the first data to the second node when it is judged that the first node is the relay node, and discards the first data when it is judged that the first node is not the relay node and the destination node.

If the first node receives the second data through the second data receiving unit, the processing unit 130 may include a mode judger, a destination node judger, a relay node judger, a data processor, and the like.

The mode judger judges whether the measured mode value of the first node is the first mode which coincides with the predetermined first data processing criterion.

When it is judged that the measured mode value of the first node is not the first mode, the destination node judger judges whether the first node is the destination node that will finally receive the second data.

When it is judged that the first node is not the destination node, the relay node judger judges whether the first node is a relay node that relays the second data.

The data processor discards the second data when it is judged that the corresponding mode value is the first mode or that the first node is the not the relay node and the destination node, provides the second data to the user when it is judged that the first node is the destination node and that the corresponding mode value is not the first mode, and transmits the second data to the second node when it is judged that the first node is the relay node and that the corresponding mode value is not the first mode.

Figure 2:
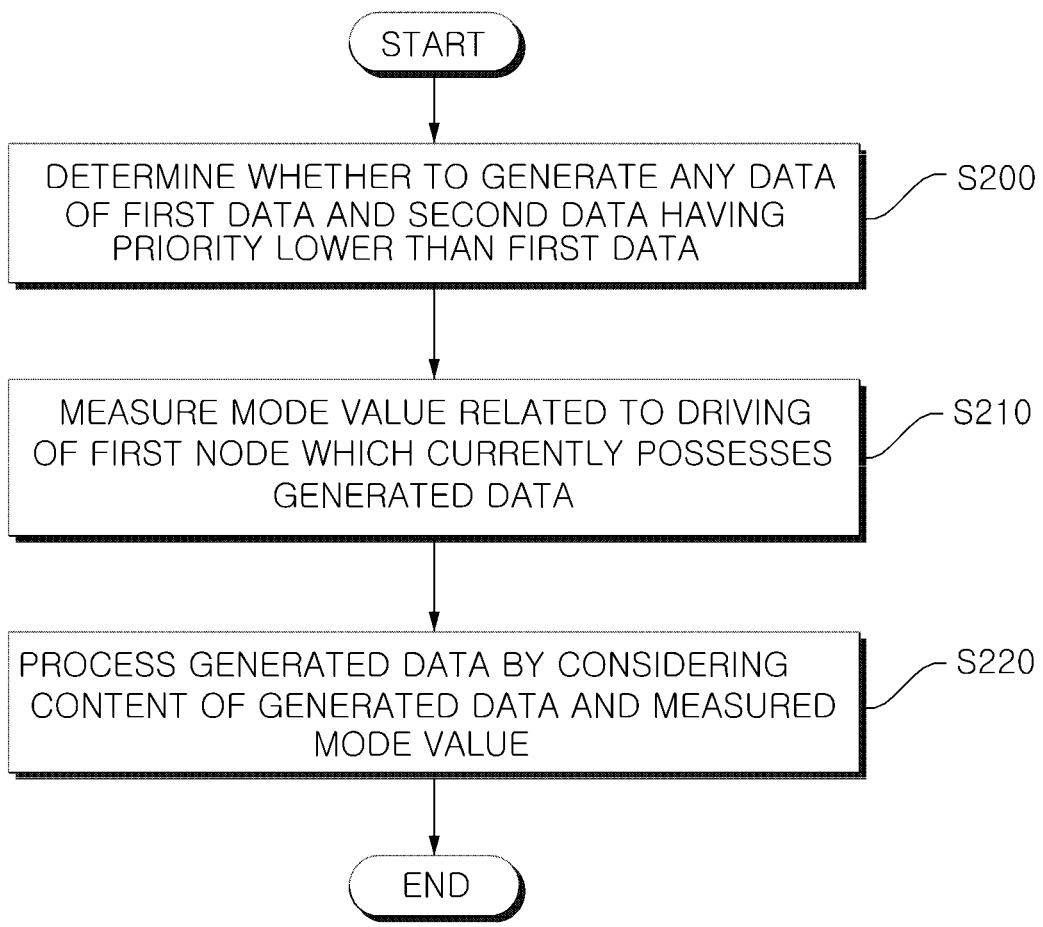
FIG. 2 is a flowchart of a method for processing data in an ad-hoc network according to an exemplary embodiment of the present invention.

Next, a data processing method of the data processing apparatus 100 in the ad-hoc network will be described. FIG. 2 is a flowchart of a method for processing data in an ad-hoc network according to an exemplary embodiment of the present invention.

In the ad-hoc network according to the exemplary embodiment, first data is set as voice data and second data is set as data other than the voice data. The data other than the voice data may be, for example, video data, text, symbol, and sign data, and the like. Further, at least one node that is provided on the ad-hoc network according to the exemplary embodiment is a movable node. The following description is made with reference to FIG. 2.

First, a determination unit 110 determines whether to generate any one of first data and second data having a priority lower than the first data (S200).

Hereinafter, when predetermined data is generated in accordance with the determination, a measurement unit 120 measures a mode value related to the driving of a first node constituting the ad-hoc network (S210). In the exemplary embodiment, the first node, which currently possesses the predetermined generated data, is a node that generates the predetermined data or a node that receives the predetermined data to another node.

Thereafter, a processing unit 130 processes the generated data by considering a content of the generated data and the measured mode value (S220).

After any data to be generated is determined (S200), a first data generating unit may generate the first data. If the first node generates the first data, the data processing process (S220) of the processing unit 130 may be performed as below.

At a first step, if the measured mode value of the first node is a second mode which does not coincide with a predetermined first data processing criterion, a mode converter forces the first node into the first mode which coincides with the first data processing criterion.

When the mode value of the first node is changed to the first mode, a set-up node designating portion designates a node having the higher priority between a destination node of the first data and the first node as a mode setup node that will set up mode conversion of the first node. If the destination node and the first node have the equivalent priority, the set-up node designating portion designates any node of the destination node and the first node as the mode setup node. Thereafter, the mode converter forces the first node into the first mode on the occurrence of the mode setup node and a time setting portion sets a timer value to maintain the first mode.

Meanwhile, if the mode value of the first node measured at the first step is the first mode, a priority judging portion of the mode converter judges whether at least one node of the destination node of the first data and the first node, a candidate mode setup node, has a priority higher than or the same as the current mode setup node that formerly forced the first node into the first mode. In this case, a data transmission priority depending on a predetermined routing protocol may be used as the priority judgment criterion. Thereafter, if the candidate mode setup node has the priority higher than or the same as the current mode setup node, the set-up node designating portion sets up the node having the higher priority between the destination node and the first node as the new mode setup node and the time changing portion changes a first mode maintaining timer value of the first node on the occurrence of the new mode setup node. If the destination node and the first node have the equivalent priority, the set-up node designating portion designates any node of the destination node and the first node as the mode setup node. In contrast, the processing unit 130 discards the first data if the candidate mode setup node has the priority lower than the mode setup node.

At a second step after the first step, the destination node judger judges whether the first node is the destination node that will finally receive the first data.

Thereafter, at a third step, when it is judged that the first node is the destination node, the data processor provides the first data to a user and when it is judged that the first node is not the destination node, the data processor transmits the first data to the second node.

If the first node generates the second data, the data processing process (S220) of the processing unit 130 may be performed as below.

At the first step, if the measured mode value of the first node is the first mode which coincides with the predetermined first data processing criterion, the processing unit 130 discards the second data and when the mode value of the first node is the second mode, the destination node judger judges whether the first node is a destination node that will finally receive the second data.

Thereafter, at the second step, when it is judged that the first node is the destination node, the data processor provides the second data to the user of the first node and when it is judged that the first node is not the destination node, the data processor transmits the second data to the second node.

Meanwhile, the first node receives the first data, the processing unit 130 processes the first data depending on whether the measured mode value of the first node is the first mode which coincides with the predetermined first data processing criterion or the second mode which does not coincide with the first data processing criterion. A detailed description will be made below.

When the mode value of the first node is the first mode, the priority judger judges whether at least one node of the destination node of the first data and the source node of the first data, a candidate mode setup node, has a priority higher than or the same as the current mode setup node that formerly forced the first node into the first mode. Thereafter, if the candidate mode setup node has the priority higher than or the same as the current mode setup node, the set-up node designating portion sets up the node having the higher priority of the destination node and the source node as the new mode setup node and the time changing portion changes the first mode maintaining timer value of the first node on the occurrence of the new mode setup node. When the destination node and the source node have an equivalent priority, the set-up node designating portion designates any one of the destination node and the source node as the mode setup node. In contrast, the processing unit 130 discards the first data if the candidate mode setup node has the priority lower than the current mode setup node. Thereafter, the destination node judger judges whether the first node is the destination node that will finally receive the first data. Thereafter, when it is judged that the first node is the destination node, the data processor provides the first data to the user and when it is judged that the first node is not the destination node, the relay node judger judges whether the first node is a relay node that relays the first data. Thereafter, when it is judged that the first node is the relay node, the data processor transmits the first data to the second node and when it is judged that the first node is not the relay node, the data processor discards the first data.

When the mode value of the first node is the second mode, the set-up node designating portion designates a node having the higher priority between the destination node of the first data and the source node of the first data as the mode setup node that sets up mode conversion of the first node. When the destination node and the source node have an equivalent priority, the set-up node designating portion designates any one of the destination node and the source node as the mode setup node. Thereafter, the mode converter forces the first node into the first mode on the occurrence of the mode setup node and the time setting portion sets a timer value to maintain the first mode. Thereafter, the destination node judger judges whether the first node is the destination node that will finally receive the first data. Thereafter, when it is judged that the first node is the destination node, the data processor provides the first data to the user and when it is judged that the first node is not the destination node, the relay node judger judges whether the first node is the relay node that relays the first data. Thereafter, when it is judged that the first node is the relay node, the data processor transmits the first data to the second node and when it is judged that the first node is not the relay node, the data processor discards the first data.

Meanwhile, if the first node receives the second data, the processing unit 130 may perform the following functions in sequence.

At the first step, a mode judger judges whether the measured mode value of the first node is the first mode which coincides with the predetermined first data processing criterion. Thereafter, at the second step, when it is judged that the corresponding mode value is the first mode, the data processor discards the second data and when it is judged that the corresponding mode value is not the first mode, the destination node judger judges whether the first node is the destination node that will finally receive the second data. Thereafter, at the third step, when it is judged that the first node is the destination node, the data processor provides the second data to the user of the first node and when it is judged that the first node is not the destination node, the relay node judger judges whether the first node is a relay node that relays the second data. Thereafter, at a fourth step, when it is judged that the first node is the relay node, the data processor transmits the second data to the second node and when it is judged that the first node is not the relay node, the data processor discards the second data.

Next, referring to FIG. 2, the data processing method in the ad-hoc network will be described as an exemplary embodiment.

In the exemplary embodiment, as the data processing method, a method for generating and transmitting voice data and general data using a silent mode is proposed in order to remove interference from other traffic paths at the time of transmitting urgent voice data of a node having a high priority through a network. In such a method as the transmitting method of the urgent voice data considering priorities of a source node and a destination node of the voice data, voice data of the source node having a high priority is preferentially transmitted in the case where voice traffic paths are generated in different source nodes.

Figure 3:
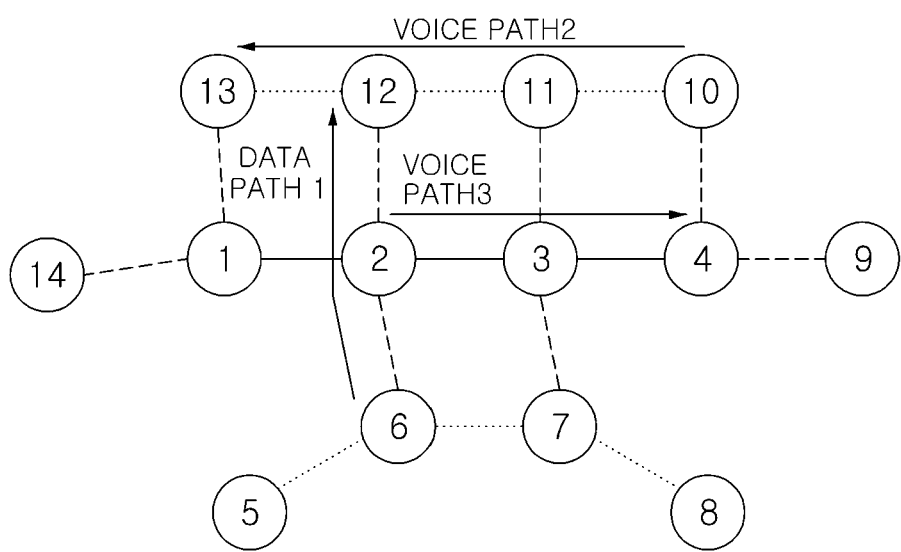
FIG. 3 is a configuration diagram of an ad-hoc network.

FIG. 3 is a configuration diagram of an ad-hoc network. According to a routing algorithm, the traffic path of the voice data from the source Node 2 to the destination Node 4 may be obtained and in the exemplary embodiment, a case in which the traffic path of the voice data is configured by Nodes, 2, 3, and 4 will be described as an example. Further, according to the routing algorithm, a case in which the traffic path of the voice data even from Nodes 10 to 13 is configured by Nodes 10, 11, 12, and 13 will be described as an example.

In the case in which the first voice data traffic path (configured by Nodes 10, 11, 12, and 13) exists, a new voice data traffic path (configured by Nodes 2, 3, and 4) is being influenced by the first traffic, for Nodes 4, 3, and 2 are positioned within transmission distances of Nodes 10, 11, 12, and 13 to be interfered and further, in contrast, the new voice data traffic path influences the interference on the first voice data traffic path.

If the voice data is being transmitted from Source Node 2 to the destination node 4 through a second voice data traffic path prior to the first voice data traffic path, then it can be assumed that Source Node 2 transmits voice data with a priority higher than Node 10.

In the exemplary embodiment, the transmitting method of the urgent voice data considering the priorities of the source node and the destination node of the voice data will be proposed.

A node that transmits the voice data or the general data among nodes on the network starts setting of the traffic path according to the routing algorithm.

When the setting of the traffic path is completed, a relay node on the path transmits the voice data or the general data transmitted from the source node to a subsequent node toward the destination.

Figure 4:
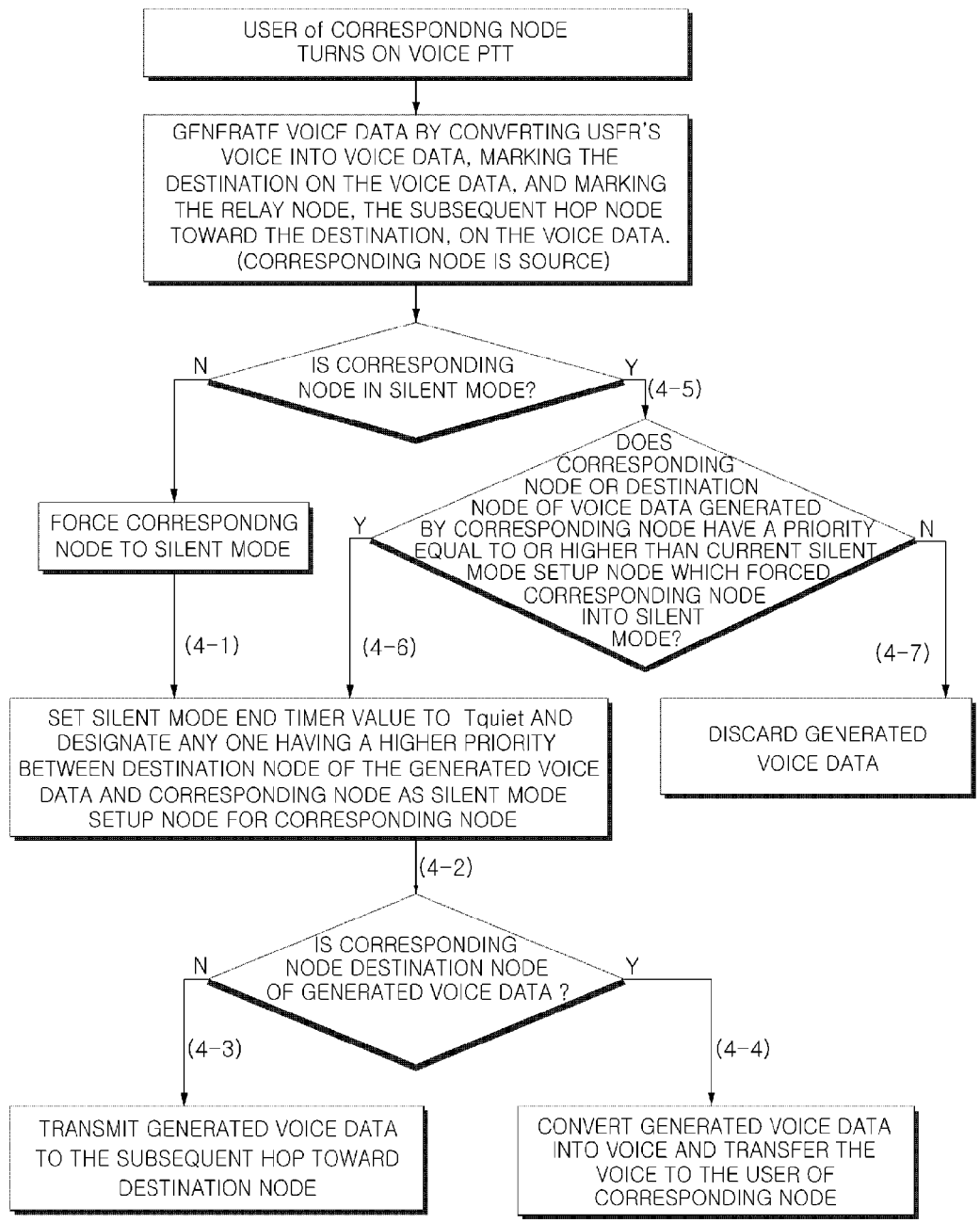
FIG. 4 shows an operational flow when the source node turns on voice push to talk (PTT) in order to transmit the voice data.

FIG. 4 shows an operational flow when the source node turns on voice push to talk (PTT) in order to transmit the voice data. The silent mode means the following predetermined status of the node.

In the silent mode, the node cannot transmit the general data.

In the silent mode, in the case in which the higher priority between the source and destination of the voice data to be transmitted is higher than or equal to the priority of the silent mode setup node, the voice data can be transmitted to a subsequent hop node toward the destination.

In the silent mode, in the case in which the higher priority between the source and destination of the voice data to be transmitted is lower than the priority of the silent mode setup node, the voice data to be transmitted shall be discarded.

Meanwhile, in the general mode, the node can transmit the voice data and the general data without a limit (regardless of the priorities of the source and destination). According to the following conditions, the node enters the silent mode from the general mode. The source or the destination of the voice data which causes entrance at the time of entering the silent mode is designated as the silent mode setup node.

Figure 5:
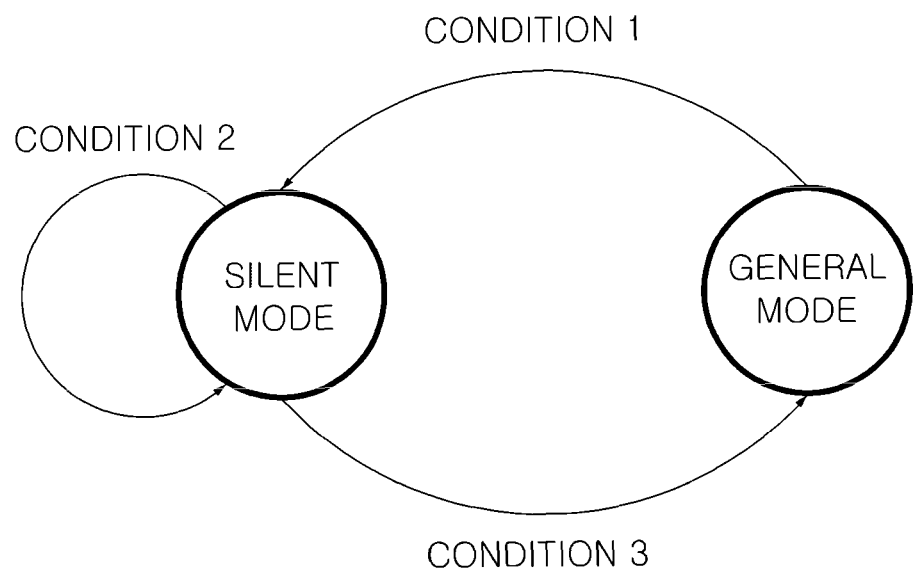
FIG. 5 is a diagram illustrating the relationship between the silent mode and the general mode of a node.

In the case in which the node first receives or generates the voice data, the node enters the silent mode from the general mode. In addition, the silent mode end timer value is set to $T_{\theta\upsilon\iota\epsilon\tau}$ and any one having the higher priority between the source and destination nodes of the voice data is designated as the silent mode setup node (Condition 1 of FIG. 5).

In the case in which the node in the silent mode receives or generates the voice data, any one having the higher priority between the source and the destinations of the voice data is set newly as the silent mode setup node when the source or destination node of the voice data has a priority equal to or higher than the current silent mode setup node. In addition, the silent mode end timer value is set to $T_{\theta\upsilon\iota\epsilon\tau}$ (Condition 2 of FIG. 5).

In the case in which the node in the silent mode receives or generates the voice data after the node enters the silent mode, the current silent mode setup node and the silent mode end timer are not changed when the source or destination node of the voice data has a priority lower than the silent mode setup node. Herein, $T_{\theta\upsilon\iota\epsilon\tau}$ has a value larger than a transmission cycle of the voice data.

The value of the silent mode end timer for the node in the silent mode decreases as time elapses and when the node reenters the silent mode, the value of the silent mode end timer is reset to $T_{\theta\upsilon\iota\epsilon\tau}$. In the case in which the node does not reenter the silent mode for an elapsed time of $T_{quiet}$, that is, when the timer value is set to 0, the node enters the general mode from the silent mode (Condition 3 of FIG. 5).

In FIG. 3, in the case in which internode communication is possible, the nodes are connected to each other through lines. Since Node 2 can communicate with Nodes 1, 3, 6, and 12, lines are drawn therebetween. Meanwhile, when Nodes 1, 3, 6, and 12 transmit data at the same time, Node 2 cannot receive the data due to interferences.

In order to describe the effect of the exemplary embodiment, it is assumed that first general data is transmitted from Source Node 6 to Destination Node 12 through Relay Node 2 in the network configuration diagram of FIG. 3 (Data path 1 of FIG. 3). In addition, it is assumed that other voice data and general data are not transmitted. Further, it is assumed that the priority of the node is the same as the node number (the smaller the number is, the higher the priority is).

Figure 6:
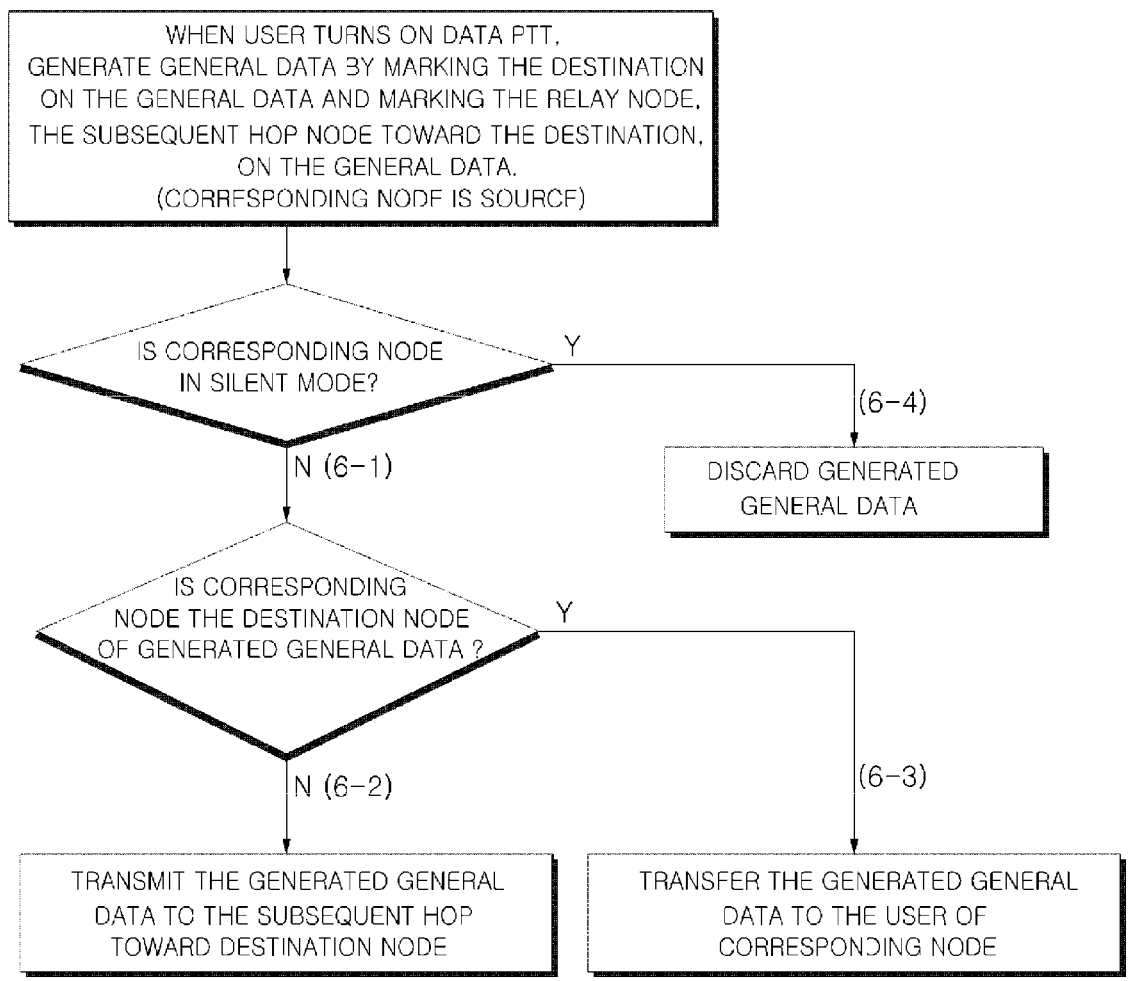
FIG. 6 is a diagram illustrating an operational flow in the case in which general data is generated in the present node.

Node 6 transmits the general data to Relay Node 2 through processes (6-1) and (6-2) of FIG. 6. FIG. 6 is an operational flow in the case in which the general data is generated in the present node.

Figure 7:
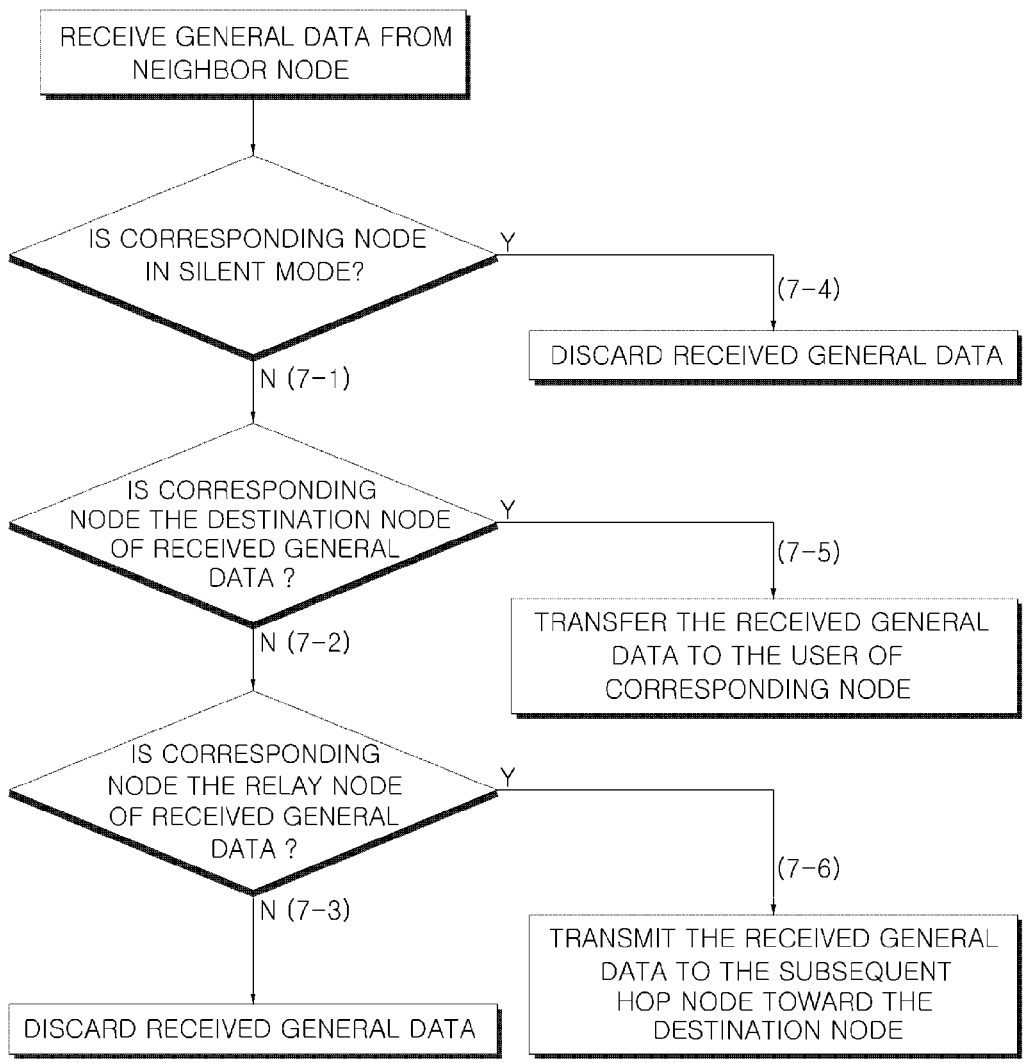
FIG. 7 is a diagram illustrating an operational flow in the case in which the general data is received in the present node.

When Node 6 transmits the general data to Relay Node 2, Nodes 5 and 7 receive the same general data and Nodes 5 and 7 discard the general data by performing processes (7-1), (7-2), and (7-3) of FIG. 7 and Node 2 transmits the general data to Destination Node 12 by performing processes (7-1), (7-2), and (7-6) of FIG. 7. FIG. 7 is an operational flow in the case of receiving the general data.

When Node 2 transmits the general data to Destination Node 12, Nodes 1, 3, and 6 discard the general data by performing processes (7-1), (7-2), and (7-3) of FIG. 7 and Destination Node 12 transfers the general data to the user by performing processes (7-1) and (7-5) of FIG. 7.

While Data Path 1 of FIG. 3 exists, it is assumed that the voice data is transmitted from Source Node 10 to Destination Node 13 through Relay Nodes 11 and 12.

Source Node 10 transmits the voice data to Relay Node 11 by performing processes (4-1), (4-2), and (4-3). In addition, Source Node 10 enters the silent mode by performing process (4-1).

Process (4-4) is used when the voice data is transferred at the source node to the user through loopback.

Figure 8:
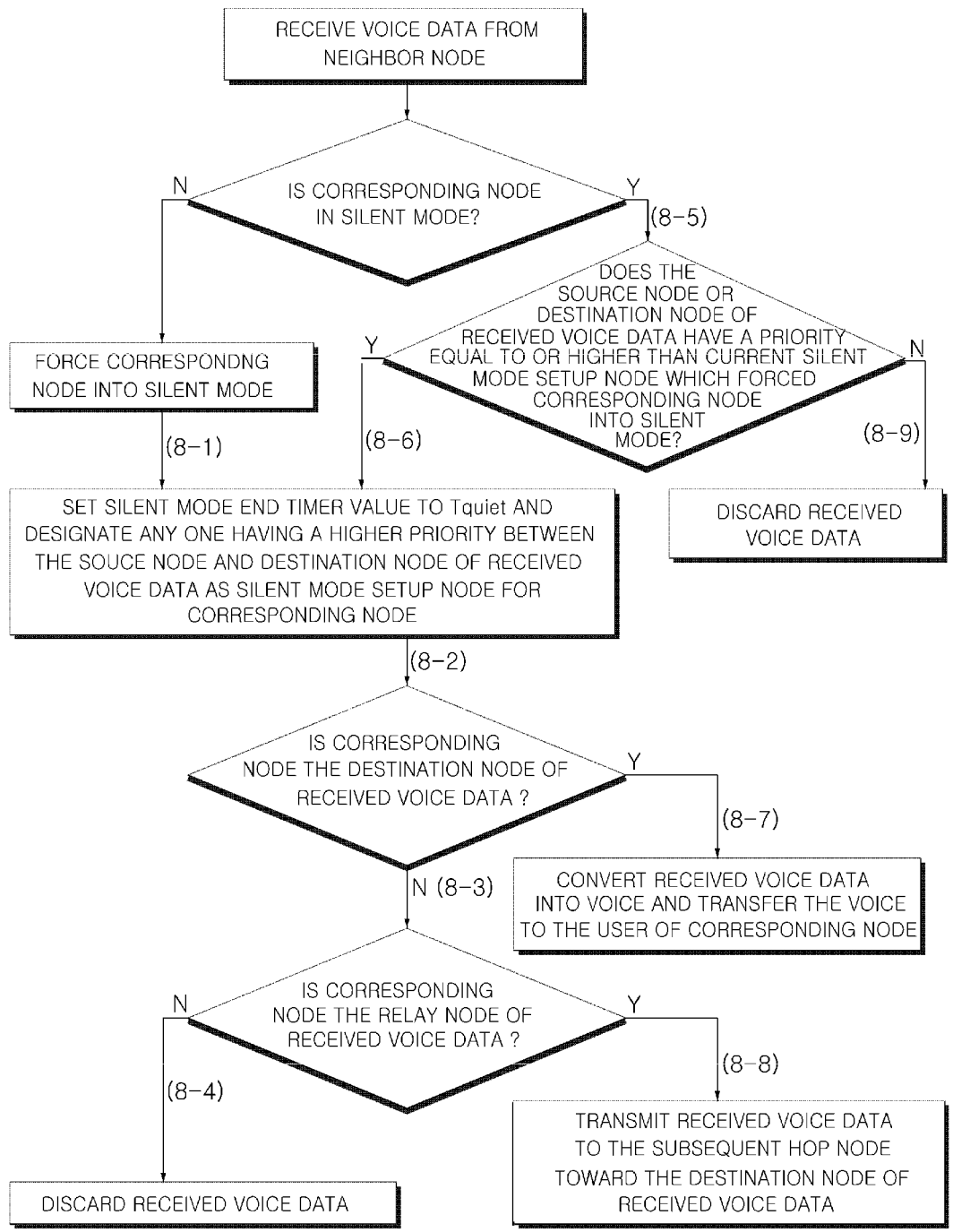
FIG. 8 is a diagram illustrating an operational flow in the case in which the voice data is received in the present node.

When Source Node 10 transmits the voice data to Relay Node 11, Node 4 discards the received voice data by performing processes (8-1), (8-2), (8-3), and (8-4) of FIG. 8, Node 4 enters the silent mode through process (8-1), Relay Node 11 transmits the voice data to Node 12 by performing processes (8-1), (8-2), (8-3), and (8-8) of FIG. 8, and Relay Node 11 enters the silent mode by performing process (8-1). FIG. 8 is an operational flow in the case of receiving the voice data.

When Relay Node 11 transmits the voice data to Relay Node 12, Node 10 discards the received voice data by performing processes (8-5), (8-6), (8-2), (8-3), and (8-4) of FIG. 8, Node 10 reenters the silent mode by performing process (8-6) of FIG. 8, Node 3 discards the received voice data by performing processes (8-1), (8-2), (8-3), and (8-4) of FIG. 8, Node 3 enters the silent mode by performing process (8-1) of FIG. 8, Node 12 transmits the voice data to Destination Node 13 by performing processes (8-1), (8-2), (8-3), and (8-8) of FIG. 8, and Node 12 enters the silent mode by performing process (8-1) of FIG. 8.

When Relay Node 12 transmits the voice data to Destination Node 13, Node 11 discards the received voice data by performing processes (8-5), (8-6), (8-2), (8-3), and (8-4) of FIG. 8, Node 11 reenters the silent mode by performing process (8-6) of FIG. 8, Node 2 discards the received voice data by performing processes (8-1), (8-2), (8-3), and (8-4) of FIG. 8, Node 2 enters the silent mode by performing process (8-1) of FIG. 8, Destination Node 13 converts the received voice data into voice and transfers the voice to the user by performing processes (8-1), (8-2), and (8-7) of FIG. 8, and Destination Node 13 enters the silent mode by performing process (8-1) of FIG. 8.

When a process of transmitting the voice data from Source Node 10 to Destination Node 13 through a voice path 2 of FIG. 3 is completed, Nodes 2, 3, 4, 10, 11, 12, and 13 have Node 10 as the silent mode setup node as shown in FIG. 9. FIG. 9 is a diagram showing a silent mode setup node for each node after transmitting the voice data. In this case, Relay Node 2 of the existing Data Path 1 enters the silent mode, such that when Node 2 receives the general data from Source Node 6 of Data Path 1, Node 2 discards the received general data by performing process (7-4) of FIG. 7. When Relay Node 12 of Voice Path 2 of FIG. 3 consecutively transmits the voice data to Destination Node 13 at a cycle shorter than $T_{\theta\upsilon\iota\epsilon\tau}$, Node 2 of Data Path 1 of FIG. 3 remains in the silent mode. Therefore, the user may transmit the voice data from the source node to the destination node without interference from neighbor nodes through Voice Path 2 of FIG. 3.

While Data Path 1 and Voice Path 2 of FIG. 3 exist, it is assumed that the voice data is transmitted from Source Node 2 to Destination Node 4 through Relay Node 3. Source Node 2 transmits the voice data to Relay Node 3 by performing processes (4-5), (4-6), (4-2), and (4-3) of FIG. 4 and Source Node 2 reenters the silent mode by performing process (4-6).

When Source Node 2 transmits the voice data to Relay Node 3, Node 1 discards the received voice data by performing processes (8-1), (8-2), (8-3), and (8-4) of FIG. 8, Node 1 enters the silent mode by performing process (8-1) of FIG. 8, Node 6 also operates in the same manner as Node 1, Node 12 discards the received voice data by performing processes (8-5), (8-6), (8-2), (8-3), and (8-4) of FIG. 8, Node 12 reenters the silent mode by performing process (8-6) of FIG. 8, Relay Node 3 transmits the voice data to Destination Node 4 by performing (8-5), (8-6), (8-2), (8-3), and (8-8) of FIG. 8, and Relay Node 3 reenters the silent mode by performing process (8-6) of FIG. 8. In this case, the silent mode setup node of Node 12 is changed from Node 10 to Node 2 to discard the voice data on Voice Path 2 of FIG. 3 transmitted from Node 11 by performing (8-5) and (8-9) of FIG. 8.

When Relay Node 3 transmits the voice data to Destination Node 4, Node 2 discards the received voice data by performing processes (8-5), (8-6), (8-2), (8-3), and (8-4) of FIG. 8, Node 2 reenters the silent mode by performing process (8-6) of FIG. 8, Node 7 discards the received voice data by performing processes (8-1), (8-2), (8-3), and (8-4) of FIG. 8, Node 7 enters the silent mode by performing process (8-1) of FIG. 8, Node 11 discards the received voice data through processes (8-5), (8-6), (8-2), (8-3), and (8-4) of FIG. 8, Destination Node 4 converts the received voice data into voice to transfer the voice to the user by performing processes (8-5), (8-6), (8-2), and (8-7) of FIG. 8, and Destination Node 4 reenters the silent mode by performing process (8-6) of FIG. 8.

As described above, according to the exemplary embodiments of the present invention, by removing interference of other nodes at the time of transmitting urgent voice data of Voice Path 3 of FIG. 3, it is possible to reduce a transmission delay of the urgent voice data and prevent a transmission loss, for the source of the urgent voice data, Node 2, has the highest priority among the sources and destinations of Voice Paths.

The present invention can be applied to an ultra wide band (UWB) based portable solider communication system. For example, the present invention can be applied to transmit voice data between radio devices constituting an MANET.

Hitherto, the present invention has been described based on the exemplary embodiments. It will be appreciated by those skilled in the art that various modifications, changes, and substitutions can be made without departing from the essential characteristics of the present invention. Accordingly, the exemplary embodiments disclosed in the present invention and the accompanying drawings are used not to limit but to describe the spirit of the present invention. The protection scope of the present invention must be analyzed by the appended claims and it should be analyzed that all spirits within a scope equivalent thereto are included in the appended claims of the present invention.

What is claimed is:

1. A method for processing data in an ad-hoc network, comprising:
   receiving, by a data processing apparatus of a first node, a received data;
   determining, by the data processing apparatus of the first node, whether the received data is a first data or a second data having a priority lower than the first data;
   measuring, by the data processing apparatus of the first node, a measured mode value related to a driving of the first node by deciding whether the measured mode value is a first mode or a second mode by considering whether the measured mode value coincides with a predetermined first data processing criterion or a second mode which does not coincide with the first data processing criterion; and
   processing, by the data processing apparatus of the first node, the received data, wherein when the received data is a first data and the measured mode value is the first mode, the processing includes
      judging whether a destination node of the first data or a source node of the first data has a priority higher than or equal to a mode setup node which formerly forced the first node into the first mode;
      when at least one of the destination node and the source node has a priority higher than or equal to the mode setup node, designating the node having the higher priority between the destination node and the source node as a new mode setup node replacing the mode setup node, and changing, by the designation of the new mode setup node, a first mode maintaining timer value of the first node, and when at least one of the destination node and the source node has a priority lower than the mode setup node, discarding the first data
      judging whether the first node is the destination node which will finally receive the first data;
      when the first node is the destination node, providing, by the first node, the first data to the user and when the first node is not the destination node, judging whether the first node is a relay node which relays the first data; and
      when the first node is the relay node, transmitting, by the first node, the first data to a second node and when the first node is not the relay node, discarding the first data.

2. method of claim 1, wherein when the received data is a first data and the measured mode value is the second mode, the processing includes:
   designating a node of the higher priority between the destination node of the first data and the source node of the first data as the mode setup node which sets up mode conversion of the first node;
   forcing the first node into the first mode on the occurrence of the mode setup node and setting a timer value to maintain the first mode;
   judging whether the first node is the destination node of the first data;
   when the first node is the destination node, providing, by the first node, the first data to the user and when the first node is not the destination node, judging whether the first node is the relay node which relays the first data; and
   when the first node is the relay node, transmitting the first data to the second node and when the first node is not the relay node, discarding the first data.

3. The method of claim 2, wherein a data transmission priority depending on a predetermined routing protocols is used on the basis of a priority judgment criterion.

4. The method of claim 1,
   wherein when the received data is a second data, and the measured mode value is the first node, the processing step includes
   judging whether the first node is a destination node of the second data;
   when it is judged that the first node is the destination node, providing, by the first node, the second data to the user and when it is judged that the first node is not the destination node, judging whether the first node is a relay node which relays the second data; and
   when it is judged that the first node is the relay node, transmitting, by the first node, the second data to the second node and when it is judged that the first node is not the relay node, discarding, by the first node, the second data.

5. The method of claim 4, wherein a data transmission priority depending on a predetermined routing protocols is used on the basis of a priority judgment criterion.

6. The method of claim 1, wherein a data transmission priority depending on a predetermined routing protocols is used on the basis of a priority judgment criterion.

7. An apparatus for processing data in an ad-hoc network, comprising:
- a determination unit of a data processing apparatus of a first node that determines whether a received data of the first node is a first data and or a second data having a priority lower than the first data;
- a measurement unit of a data processing apparatus of the first node that measures a measured mode value related to a driving of the first node by deciding whether the measured mode value is a first mode or a second mode by considering whether the measured mode value coincides with a predetermined first data processing criterion; and
- a processing unit of a data processing apparatus of the first node that processes the first data depending on the mode value of the first node when the first node receives the first data, wherein when the mode value of the first node is the first mode, the processing unit includes
  - a priority judging portion judging whether at least one of a destination node which will finally receive the first data and a source node which generated the first data has a priority higher than or equal to a mode setup node which formerly forced the first node into the first mode;
  - a setup node designating portion designating the node having the higher priority between the destination node and the source node as a new mode setup node replacing the mode setup node when at least one of the destination node and the source node has a priority higher than or equal to the mode setup node at the priority judging portion;
  - a time changing portion changing a first mode maintaining timer value of the first node on the occurrence of the new mode setup node;
  - a destination node judger judging whether the first node is the destination node which will finally receive the first data
  - a relay node judger judging whether the first node is a relay node that transmits the first data to a second node when the first node is not the destination node; and
  - a data processor discarding the first data when both the destination node and the source node have a priority lower than the mode setup node, providing the first data to the user when the first node is the destination node, transmitting the first data to the second node when the first node is the relay node, and discarding the first data when the first node is not the relay node.

8. The apparatus of claim 7, wherein when the mode value of the first node is the second mode, the processing unit includes
- a priority judging portion judging a node with the higher priority between a destination node which will finally receive the first data and a source node which generated the first data
- a setup node designating portion designating the node as a mode setup node which sets up mode conversion of the first node;
- a conversion portion forcing the first node into the first mode on the occurrence of the mode setup node;
- a time changing portion setting a timer value to maintain the first mode;
- a destination node judger judging whether the first node is the destination node which will finally receive the first data;
- a relay node judger judging whether the first node is a relay node that transmits the first data to a second node when the first node is not the destination node; and
- a data processor providing the first data to the user when the first node is the destination node, transmitting the first data to the second node when the first node is the relay node and discarding the first data when the first node is not the relay node.

9. A method for processing data in an ad-hoc network, comprising:
- receiving, by a data processing apparatus of a first node, a received data;
- determining, by the data processing apparatus of the first node, whether the received data is a first data or a second data having a priority lower than the first data;
- measuring, by the data processing apparatus of the first node, a measured mode value related to a driving of the first node by deciding whether the measured mode value is a first mode or a second mode by considering whether the measured mode value coincides with a predetermined first data processing criterion or a second mode which does not coincide with the first data processing criterion; and
- processing, by the data processing apparatus of the first node, the received data, wherein when the received data is first data and the measured mode value is the second mode, the processing includes
  - designating a node of the higher priority between a destination node of the first data and a source node of the first data as a mode setup node which sets up mode conversion of the first node;
  - forcing the first node into the first mode on the occurrence of the mode setup node and setting a timer value to maintain the first mode;
  - judging whether the first node is the destination node of the first data;
  - when the first node is the destination node, providing, by the first node, the first data to the user and when the first node is not the destination node, judging whether the first node is a relay node that relays the first data; and
  - when the first node is the relay node, transmitting the first data to a second node and when the first node is not the relay node, discarding the first data.

10. The method of claim 9, wherein when the received data is a second data, and the measured mode value is the first node, the processing step includes
- judging whether the first node is a destination node of the second data;
- when it is judged that the first node is the destination node, providing, by the first node, the second data to the user and when it is judged that the first node is not the destination node, judging whether the first node is a relay node which relays the second data; and
- when it is judged that the first node is the relay node, transmitting, by the first node, the second data to the second node and when it is judged that the first node is not the relay node, discarding, by the first node, the second data.

11. The method of claim 10, wherein a data transmission priority depending on a predetermined routing protocols is used on the basis of a priority judgment criterion.

12. The method of claim 9, wherein a data transmission priority depending on a predetermined routing protocols is used on the basis of a priority judgment criterion.

* * * * *